United States Patent [19]

Nyberg

[11] 4,113,594
[45] Sep. 12, 1978

[54] POLY(TETRAMETHYLENETEREPHTHALATE) CROSSLINKED BY IRRADIATION

[75] Inventor: David Dolph Nyberg, Sunnyvale, Calif.

[73] Assignee: Raychem Corporation, Menlo Park, Calif.

[21] Appl. No.: 856,500

[22] Filed: Dec. 1, 1977

Related U.S. Application Data

[63] Continuation of Ser. No. 702,202, Jul. 2, 1976, Pat. No. 4,073,830, which is a continuation-in-part of Ser. No. 405,522, Oct. 11, 1973, Pat. No. 3,968,015.

[51] Int. Cl.$^2$ .................. C08F 8/00; C08G 18/00
[52] U.S. Cl. .................. 204/159.15; 204/159.17; 204/159.19; 260/860; 260/873
[58] Field of Search ............ 204/159.15; 260/75 N, 260/75 T, 860, 873

[56] References Cited

U.S. PATENT DOCUMENTS

| | | | |
|---|---|---|---|
| 3,723,568 | 3/1973 | Hoeschle | 260/835 |
| 3,729,446 | 4/1973 | Holub et al. | 260/47 XA |
| 3,770,697 | 11/1973 | Holub et al. | 260/47 XA |
| 3,784,520 | 1/1974 | Hoeschle | 260/75 R |
| 3,968,015 | 7/1976 | Nyberg | 204/159.15 |
| 4,073,830 | 2/1978 | Nyberg | 260/860 |

*Primary Examiner*—Richard B. Turer
*Attorney, Agent, or Firm*—Lyon & Lyon

[57] ABSTRACT

Crosslinking, e.g., by irradiation, of a polymer comprising poly(tetramethyleneterephthalate) is made possible by the addition of a member selected from the group consisting of triallyl cyanurate and N,N'-m-phenylenedimaleimide. The resulting crosslinked modified polymer may be rendered heat recoverable.

6 Claims, No Drawings

POLY(TETRAMETHYLENETEREPHTHALATE) CROSSLINKED BY IRRADIATION

CROSS REFERENCE TO RELATED APPLICATIONS

This application is a continuation of application Ser. No. 702,202, filed July 2, 1976 now U.S. Pat. No. 4,073,830, which is a continuation-in-part of my copending application Ser. No. 405,522 filed Oct. 11, 1973, now U.S. Pat. No. 3,968,015 the disclosure of which is incorporated by reference.

FIELD OF THE INVENTION

In one aspect this invention relates to cross-linked poly(tetramethyleneterephthalate). In another aspect it relates to heat recoverable articles of poly(tetramethyleneterephthalate).

BACKGROUND OF THE INVENTION

The crosslinking of many polymers by irradiation or by chemical means to improve their properties is a relatively new technology which has been found useful with many polymers, e.g., polyethylene, polyvinylchloride, polyoxymethylenes, polyvinylidene difluoride, etc. It is also known that the addition to such polymers of monomers which function as crosslinking promoters will have beneficial effects, e.g., as disclosed in U.S. Pat. Nos. 3,215,671 and 3,494,883. However, for some polymers only one or a few monomers function effectively in this regard and even for those polymers for which a substantial number of monomers are beneficial, there is a significant amount of selectivity and, in many cases, a drastic difference in effectiveness of monomers. Other patents disclosing such technology are U.S. Pat. Nos. 2,965,553; 3,137,674; and 3,580,829. Furthermore, it is known that the property of heat recoverability may be imparted to crosslinked polymers, e.g., according to the process of Cook et al U.S. Pat. No. 3,086,242, the disclosure of which is incorporated by reference herein.

However, as indicated in U.S. Pat. No. 3,142,629, not all polymers are susceptible to improvement by crosslinking, even with the addition of monomers which promote crosslinking in other polymers. Among polymers in wide use, polyethyleneterephthalate is perhaps the most significant polymer which has not been successfully crosslinked by irradiation. A closely related polymer, poly(tetramethyleneterephthalate) has likewise been found by applicant to realize no crosslinking when irradiated.

THE PRESENT INVENTION

It has been found that the addition of a member selected from the group consisting of N,N'-m-phenylenedimaleimide and triallyl cyanurate is unexpectedly effective in imparting crosslinkability to poly(tetramethyleneterephthalate), e.g., when the resulting mixture is irradiated. According, it is an object of the present invention to provide a useful crosslinked poly(tetramethyleneterephthalate)-containing polymer. It is a further object of the present invention to devise methods and compositional blends which impart desired modifications in properties of the crosslinked poly(tetramethyleneterephthalate)-containing polymer.

Poly(tetramethyleneterephthalate) is a condensation polymer of terephthalic acid and 1,4-butanediol. However, there is no departure from the scope of the present invention when other moieties are blended with poly(tetramethyleneterephthalate) or other monomers are copolymerized with tephthalic acid and 1,4-butanediol, provided that such blending or copolymerization does not destroy the capacity of the resulting product to be crosslinked after the addition of N,N'-m-phenylenedimaleimide. For example, it is not uncommon to copolymerize ethylene glycol and 1,4-butanediol with terephthalic acid.

A particularly preferred blending material for admixing with poly(tetramethyleneterephthalate) is the block copolymer consisting of two or more alternating segments of polytetramethyeleneether with poly(tetramethyleneterephthalate). Such copolymers are sold under the name Hytrel, e.g., Hytrel 4055, Hytrel 5555 and Hytrel 6355 and have the general formula:

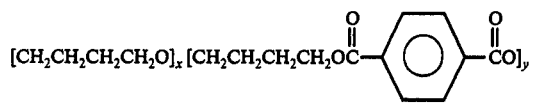

in which x and y may be varied over a wide range. Two or more alternating segments of $[CH_2CH_2CH_2CH_2O]$ and

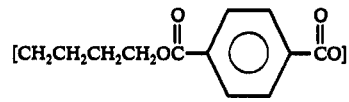

are possible. These block copolymers are also regarded as being "polytetramethyleneterephthalate" for the purpose of this invention.

The amount of N,N'-m-phenylenedimaleimide or triallyl cyanurate which may be used in the present invention will, as a minimum, be that effective to permit crosslinking of a given poly(tetramethyleneterephthalate)-containing polymer. In general, from about one to about three parts of N,N'-m-phenylenedimaleimide per hundred parts of polymer will give beneficial results. However, given the concept of the present invention, only routine experimentation will be required to establish an effective crosslinking amount of N,N'-phenylenedimaleimide or triallyl cyanurate.

Radiation dose levels to achieve crosslinking according to the present invention may range from about 2 to about 80 megarads or more, but a dose of about 10 to 40 megarads is preferred. For most purposes, a dose of about 20 megarads will be effective.

The present invention is further illustrated by the following examples of specific embodiments thereof.

EXAMPLE 1

One hundred parts of Tenite 6PRO, a poly(tetramethyleneterephthalate) manufactured by Eastman Chemical Products, Inc., was combined with 3 parts of N,N'-m-phenylenedimaleimide (HVA-2 manufactured by Du Pont which has a melting point of about 200° C and is stable at temperatures up to 250° C). Samples of this material were irradiated using a 1 mev electron beam to the dose levels shown in Table I. As indicated in Table I, one set of samples was irradiated at room temperature, a second set of samples was irradiated at room temperature and then immediately placed in an oven at 145° C, and a third set of samples was irradiated while sitting on a hot plate at 95° C. After irradiation, each sample was expanded at 240° C (the melting point of Tenite 6PRO is about 224° C) and held at the expanded dimension until cooled to room temperature. The samples were then caused to undergo heat recovery by heating to above the melting point in the absence of any physical restraint. The degree of expansion and degree of recovery are shown in Table I.

TABLE I

| Irradiation Conditions | $M_{100}$ (240° C) psi | Elastic Memory (240° C) | |
|---|---|---|---|
| | | % Expansion | % Recovery |
| Specimens beamed at room temperature | | | |
| 10 Mrads | 3.8 | 311 | 99 |
| 20 Mrads | 11 | 374 | 100 |
| 40 Mrads | 59 | 294 | 100 |
| 80 Mrads | 69 | 188 | 100 |
| Specimens beamed at room temperature followed by placing immediately in an oven at 145° C | | | |
| 40 Mrads | 72 | 238 | 100 |
| 80 Mrads | 74 | 175 | 100 |
| Specimens beamed while sitting on hot plate (ca. 95° C) under beam | | | |
| 10 Mrads | 42 | 263 | 99 |
| 20 Mrads | 59 | 194 | 100 |
| 40 Mrads | 75 | 129 | 100 |
| 80 Mrads | 89 | 104 | 100 |

As can be seen from Table I, the static modulus at 240° C ($M_{100}$) for each sample increased with increasing dose levels, thereby establishing that crosslinking occurred in each case. In marked contrast, a sample of Tenite 6PRO containing no HVA-2 showed no measurable static modulus even after a dose of 80 Mrads, thereby establishing that no measurable crosslinking occurs when the polymer alone is irradiated.

The elastic memory (or heat recovery) data shown in Table I establish that the crosslinked polymer has excellent performance in this regard, with expansions of over 300% possible and recovery close to or at 100% in each case. When non-crosslinked polymer is expanded, it is found that high expansions, e.g., 100% or more, are not usefully obtained because the degree of recovery decreases with increasing expansion, e.g., an expansion of 80% at 145° C will recover less than 50% of the expanded dimension when heated at 195° C, and even at low expansions, e.g., 40% or less, complete recovery is not possible, e.g., an expansion of 40% at 145° C will recover less than 70% of the expanded dimension when heated at 195° C.

It may also be noted from Table I that heating either during or immediately after irradiation (beaming) resulted in a greater degree of crosslinking at equivalent dose levels as shown by the higher static modulus obtained when such heating occurred.

EXAMPLE 2

Test specimens in the form of injection molded ASTM D-638, type IV, tensile dumbbells and bars were prepared from Tenite 6PRO and a 75:25 Tenite 6PRO/Hytrel 4055 blend. Some specimens of each were irradiated to doses of 20 and 80 megarads. Ultimate tensile strength, ultimate elongation, and impact strength are increased by the presence of Hytrel, but tensile strength at yield and flexural elastic modulus are reduced by its presence. Broadly speaking, flexibility is increased and stiffness decreased by the presence of Hytrel. Some representative results are shown in Table II. Each irradiated specimen contains 3 parts per hundred of HVA-2.

TABLE II

| | Tenite 6PRO | | | 75:25 Tenite 6PRO Hytrel 4055 | |
|---|---|---|---|---|---|
| Dose Level, Mrads. | 0 | 20 | 80 | 20 | 80 |
| Ultimate tensile strength, psi | 7600 | 6000 | 5650– | 8270 | 7100 |
| Tensile strength at yield, psi | 7300 | 7800 | 8100 | 5500 | 5900 |
| Ultimate elongation, % | 340 | 200 | 130 | 350 | 250 |
| Impact strength, foot-pounds/inch (notched) | 0.68–0.81 | 0.62–0.73 | 0.83–1.04 | 2.59 | 2.3 |
| Flexural elastic modulus, $10^5$ psi | 3.3 | 3.3 | 3.3 | 2.2 | 2.3 |

ASTM D638 was used to measure ultimate tensile strength, tensile strength at yield and ultimate elongation while ASTM D256 was used to measure impact strength. ASTM D790 was used to measure flexural elastic modulus.

EXAMPLE 3

Samples of Tenite 6PRO containing 3 parts per hundred of HVA-2 were irradiated to doses of 10, 20, 40 and 80 megarads. Notched impact strength determinations were then made for samples given no further treatment and for samples heated to 240° C and then quickly quenched in ice water. At each dose level, it was found that the impact strength of the quenched samples was at least about twice that of the samples given no further treatment.

EXAMPLE IV

Tenite 6PRO (100 parts by weight) was blended with a series of monomers commonly used as crosslinking adjuvants for radiation crosslinking including N,N'-m-phenylenedimaleimide and triallyl cyanurate. The ingredients were first dry blended and then extruded through a ¾ inch Brabender extruder to effect mixing in the melt. Temperatures ranged from 390°–480° F in the extruder and dwell time in the extruder was less than 1 minute. Extruded strands were chopped to form pellets which were dried at 121° C (250° F) for 4 hours. Sample slabs about 12 mils thick were compression molded from the pellets and irradiated to dose levels of 40 or 80 megarads.

The static modulus at 100% elongation for each sample was determined at 240° C, a temperature above the crystalline melting point for polytetramethyleneterephthalate. These data are summarized in Table III below.

TABLE III

| Name of Polyfunctional Monomer | $M_{100}$ at 240° C. (psi²) 40 Mrad | $M_{100}$ at 240° C. (psi²) 80 Mrad | Color of Material |
|---|---|---|---|
| None | Melted | Melted | White |
| N,N'-m-phenylene dimaleimide | 9 | 24 | Yellow |
| Triallyl cyanurate | 20 | 33 | White |
| Dibenzoyl-p-quinone dioxime | Melted | Melted | Dark Brown |
| N,N'-methylene bis-acrylamide | 4 | 3 | Yellow |
| Pentaerythritol tetraacrylate | 2 | 4 | White |
| Trimethylol propane trimethacrylate | <1.4 | 3 | White |
| Pentaerythritol tetramethacrylate | <1 | 1 | Off White |
| Bis(2-methacryloxyethyl)terephthalate | Melted | Melted | White |
| Triacrylate of (tris-2-hydroxy ethyl) isocyanurate | 2 | 4 | White |
| Triallyl phosphate | Melted | Melted | Tan |
| Bis(allyl ether) of tetrabromo bisphenol A | Melted | Melted | Dark Tan |

A consideration of the data in Table III demonstrates that, unexpectedly, only N,N'-m-phenylenedimaleimide and triallyl cyanurate caused significant crosslinking of poly(tetramethyleneterephthalate) even at 80 megarads.

EXAMPLE V

Blends of 100 parts by weight of polyethylene terephthalate (Arnite 200, injection molding grade available from Algemene Kuntzijdi Uni N.V. of the Netherlands) and 3 parts by weight of N,N'-m-phenylenedimaleimide or triallyl cyanurate were dry blended and extruded to form pellets in the manner described in Example IV.

Tensile test bars (¼ inch wide and ⅛ inch thick) were compression molded from the pellets. Individual bars were irradiated to doses of 80 megarads and 320 megarads respectively. The test bars were heated to 270° C in order to determine the modulus at 100% elongation ($M_{100}$). All the samples melted except that containing triallyl cyanurate exposed to 320 megarads of radiation. That sample had an $M_{100}$ of only 1.0. When hung in an oven at 270° C it flowed under its own weight. These data demonstrate that little or no crosslinking of polyethylene terephthalate took place when N,N'-m-phenylenedimaleimide and triallyl cyanurate are used as crosslinking adjuvants at even 320 megarads. These data indicate that it would not be expected that N,N'-m-phenylenedimaleimide and triallyl cyanurate would crosslink poly(tetramethyleneterephthalate).

From the foregoing, it will be apparent that the addition of N,N'-m-phenylenedimaleimide or triallyl cyanurate unexpectedly converts poly(tetramethyleneterephthalate) from a non-crosslinkable material to a material capable of being crosslinked. The specificity of such effects is indicated by the fact that N,N'-m-phenylenedimaleimide does not produce beneficial results when added to polyoxymethylenes which embrittle seriously when irradiated in spite of the fact that triallylcyanurate does produce beneficial results in polyoxymethylenes and both triallyl cyanurate and N,N'-m-phenylenedimaleimide produce beneficial results in polyvinylidenefluoride.

The crosslinked poly(tetramethyleneterephthalate) products of the present invention have good electrical insulation properties, good low temperature properties and excellent solvent resistance. Thus, such products are useful for electrical insulation, heat recoverable parts such as those disclosed in Wetmore U.S. Pat. No. 3,243,211, the disclosure of which is incorporated by reference herein, and the like.

When poly(tetramethyleneterephthalate) is blended with a block copolymer consisting of two or more alternating segments of polytetramethylene ether and poly(tetramethyleneterephthalate), the amount of copolymer added may vary over wide limits depending on the properties desired. The blend may contain up to 50% or more of the copolymer.

EXAMPLE VI

Tenite 6PRO, a poly(tetramethyleneterephthalate) containing N,N'-m-phenylenedimaleimide was fabricated into sheet form. Following irradiation crosslinking, this sheet was vacuum formed easily into various shapes. Sheet of Tenite 6PRO not containing N,N'-m-phenylenedimaleimide and not crosslinkable is very difficult to vacuum form because at the forming temperature the plastic lacks sufficient melt strength to prevent excessive sagging or melting. Crosslinking increases melt strength (viscosity) permitting heating of sheet for vacuum forming without excessive sagging or melting.

I claim:

1. A process for crosslinking poly(tetramethyleneterephthalate) comprising subjecting poly(tetramethyleneterephthalate) containing at least one part by weight of triallyl cyanurate per 100 parts by weight of polymer to irradiation with ionizing radiation to a dose of from about 2 to about 80 megarads and to a heating step wherein said heat may be applied during or after irradiation.

2. The process of claim 1 wherein said heating is performed during irradiation.

3. The process of claim 1 wherein said heating is performed immediately after irradiation.

4. The process according to claim 1 wherein said triallyl cyanurate is present in an amount from about 1 to about 3 parts by weight per 100 parts by weight of poly(tetramethyleneterephthalate).

5. The process comprising admixing of poly(tetramethyleneterephthalate) and at least one part by weight of triallyl cyanurate per 100 parts by weight of polytetramethyleneterephthalate and exposing the mixture to a dose of ionizing radiation of from about 2 to about 80 megarads.

6. The process according to claim 5 wherein said triallyl cyanurate is present in the mixture in an amount of from about 1 to about 3 parts by weight per 100 parts by weight of poly(tetramethyleneterephthalate).

* * * * *